F. B. HOWELL.
EQUALIZING MEANS FOR A THREE TRUCK LOCOMOTIVE.
APPLICATION FILED OCT. 10, 1914.
1,160,715.
Patented Nov. 16, 1915.
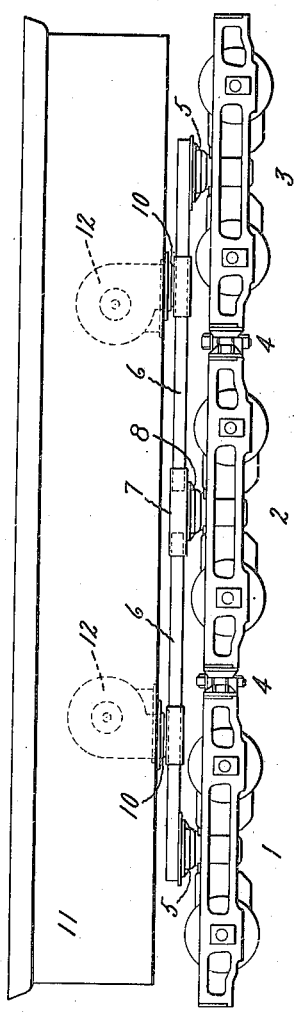
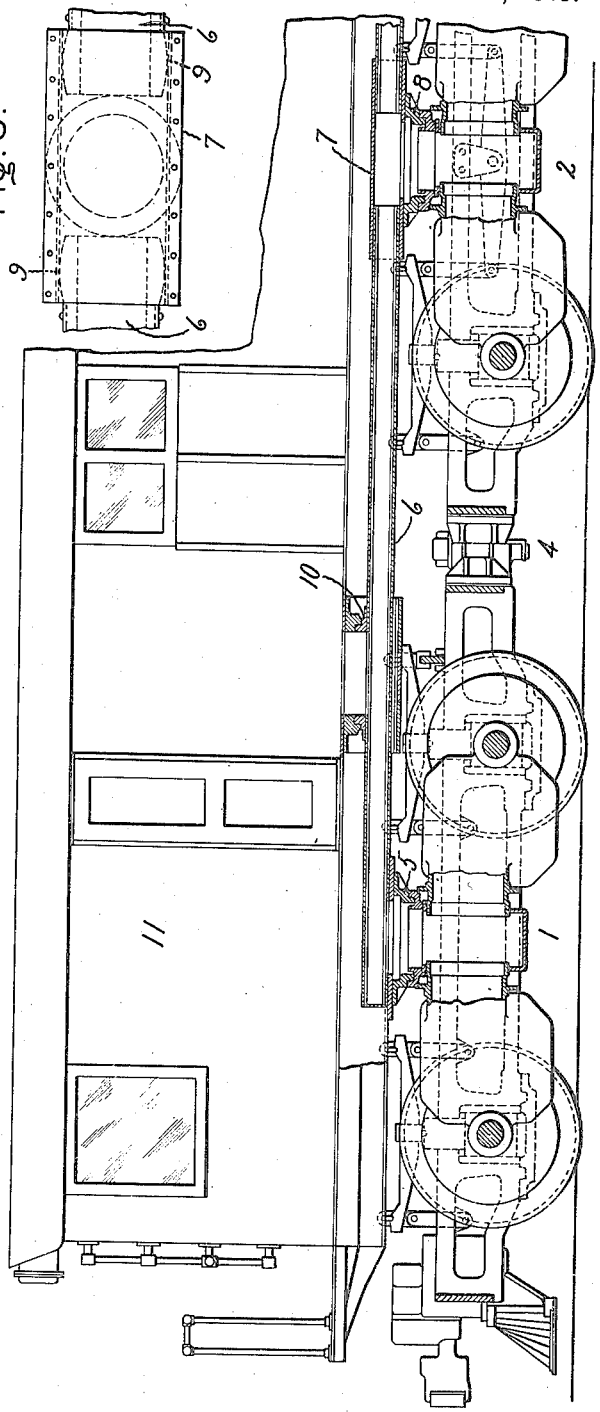
Witnesses:
Lester H. Bulmer
J. Ellis Glenn
Inventor:
Fred B. Howell,
by Albert H. Davis
His Attorney.

UNITED STATES PATENT OFFICE.

FRED B. HOWELL, OF SCHENECTADY, NEW YORK, ASSIGNOR TO GENERAL ELECTRIC COMPANY, A CORPORATION OF NEW YORK.

EQUALIZING MEANS FOR A THREE-TRUCK LOCOMOTIVE.

1,160,715.

Specification of Letters Patent.

Patented Nov. 16, 1915.

Application filed October 10, 1914. Serial No. 866,169.

*To all whom it may concern:*

Be it known that I, FRED B. HOWELL, a citizen of the United States, residing at Schenectady, county of Schednectady, State of New York, have invented certain new and useful Improvements in Equalizing Means for a Three-Truck Locomotive, of which the following is a specification.

This invention relates to electric locomotives provided with swiveling trucks, and its object is to secure a good equalizing of the load when three four-wheel trucks are used.

The invention comprises two equalizing beams, one end of each beam being supported on the center plate of an end truck, the edjacent ends of the two beams being supported in a box placed upon the center plate of the middle truck. The beams can slide into and out of this box as the locomotive passes from tangent to curve and curve to tangent. Each beam has a center plate carrying the cab, and the positions of these two center plates are so located as to distribute the load between the middle and end trucks.

In the accompanying drawing, Figure 1 is a side elevation of an electric locomotive provided with my improved equalizing system; Fig. 2 is a sectional elevation of a portion thereof on a larger scale, and Fig. 3 is a plan view of the ends of the beams where they meet at the center plate of the middle truck.

The locomotive has three four-wheeled trucks 1, 2, 3. The ends of the middle truck are articulated at 4 to the adjacent ends of the end trucks. Each end truck has a suitable center plate 5, to which is secured one end of an equalizing beam 6. The other ends of said beams have a sliding fit in the ends of a box 7 which is secured to the center plate 8 of the middle truck. The beams not only slide in the box but they are capable of a swiveling motion therein, because of the rounded projections 9 on their sides which engage with the side walls of the box. By this construction, the trucks can turn freely in rounding a curve, and the beams will not only turn in a horizontal plane but will telescope in and out of the box as the distances between the centers of the end trucks and middle truck change with the curves in the track. On each beam is a center plate 10 which supports one end of the cab 11. The position of these center plates is such that the weight of the cab is equally distributed among the three trucks; that is, the plate is at one-third the distance from the center plate of the end truck to that of the middle truck.

In the locomotive illustrated the equalizing beams are hollow and are utilized to convey air from blowers 12 to the motors for cooling them.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A locomotive having three four-wheeled swiveling trucks having center plates, and two equalizing beams each supported on the center plate of one of the end trucks and on the center plate of the middle truck, and a center plate on each beam for supporting the cab.

2. A locomotive having three four-wheeled swiveling trucks, two equalizing beams, each supported at one end on the center plate of an end truck, a device on the center plate of the middle truck affording a telescopic support for said beams, and a center plate on each beam for supporting the cab.

3. A locomotive having three four-wheeled swiveling trucks, two equalizing beams, each supported at one end on the center plate of the end truck, a device on the center plate of the middle truck affording a telescopic and swiveling support for said beams, and a center plate on each beam for supporting the cab.

4. A locomotive having three four wheeled swiveling trucks, two equalizing beams, each supported at one end on the center plate of the end truck, a device on the center plate of the middle truck affording a telescopic and a swiveling support for said beams, and a center plate on each beam for supporting the cab, said plates being located at such points on said beams as to distribute the load equally among the three trucks.

In witness whereof, I have hereunto set my hand this 9th day of October, 1914.

FRED B. HOWELL.

Witnesses:
BENJAMIN B. HULL,
HELEN ORFORD.